United States Patent
Buican

(10) Patent No.: US 7,764,415 B2
(45) Date of Patent: Jul. 27, 2010

(54) HIGH RETARDATION-AMPLITUDE PHOTOELASTIC MODULATOR

(76) Inventor: Tudor N. Buican, 332 Valverde Dr., SE., Albuquerque, NM (US) 87108

( * ) Notice: Subject to any disclaimer, the term of this patent is extended or adjusted under 35 U.S.C. 154(b) by 221 days.

(21) Appl. No.: 12/106,209

(22) Filed: Apr. 18, 2008

(65) Prior Publication Data
US 2009/0262421 A1 Oct. 22, 2009

(51) Int. Cl.
G02F 1/01 (2006.01)
G02F 1/03 (2006.01)
G02B 5/30 (2006.01)

(52) U.S. Cl. .......... 359/238; 359/250; 359/251; 359/249; 359/276; 359/279; 359/285; 359/485; 359/494; 359/246

(58) Field of Classification Search ......... 359/237–240, 359/244–246, 249–252, 276, 279, 285, 485, 359/489, 494; 398/118, 184; 315/5.26, 5.27, 315/5.29, 5.39, 39, 156
See application file for complete search history.

(56) References Cited

U.S. PATENT DOCUMENTS

| | | | | |
|---|---|---|---|---|
| 2,707,749 A * | 5/1955 | Mueller | .................. | 398/184 |
| 2,938,139 A * | 5/1960 | Lerbs | .................. | 315/5.26 |
| 2,972,701 A * | 2/1961 | Lerbs | .................. | 315/5.27 |
| 3,432,224 A * | 3/1969 | Myers et al. | ............. | 359/246 |
| 4,960,319 A | 10/1990 | Dankowych | | |
| 6,157,660 A | 12/2000 | Hill | | |
| 6,867,863 B1 | 3/2005 | Kadlec | | |
| 6,970,278 B1 * | 11/2005 | Buican | .................. | 359/240 |
| 2008/0304133 A1 * | 12/2008 | Ling | .................. | 359/285 |
| 2009/0015900 A1 * | 1/2009 | Ling | .................. | 359/240 |

OTHER PUBLICATIONS

Canit et al., "New Design for a Photoelastic Modulator," Applied Optics, vol. 22, No. 4, Feb. 15, 1983, pp. 592-594.
International Search Report for PCT/US09/40897, International Searching Authority, Dec. 28, 2009, pp. 1-14.

* cited by examiner

*Primary Examiner*—Loha Ben
(74) *Attorney, Agent, or Firm*—Samuel M. Freund; Cochran Freund & Young LLC

(57) ABSTRACT

A photoelastic modulator excited by a plurality of piezoelectric transducers affixed to the surface of a photoelastic bar for generating elastic waves in a plurality of cells each bounded by piezoelectric node drivers between which an antinode driver is disposed, is described. The standing elastic wave in each cell can be made independent of those in the neighboring cells by controlling the phase and amplitude of the drivers. The resulting elastic waves generate birefringence along the optical axis of the bar such that a linearly polarized optical wave propagating along the axis and having an initial phase, experiences a retardation of the phase as it passes through each cell. The cells may be controlled such that the phase of each standing wave does not change between cells and the phase retardation of the optical wave increases monotonically as the optical wave propagates through the bar, thereby, in theory, permitting an arbitrarily large retardation to be generated.

33 Claims, 12 Drawing Sheets

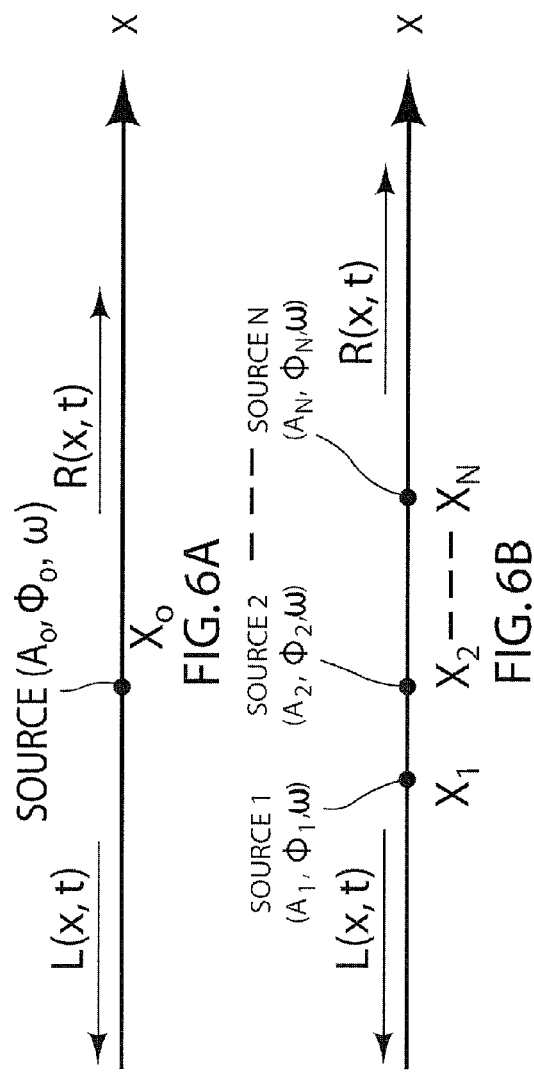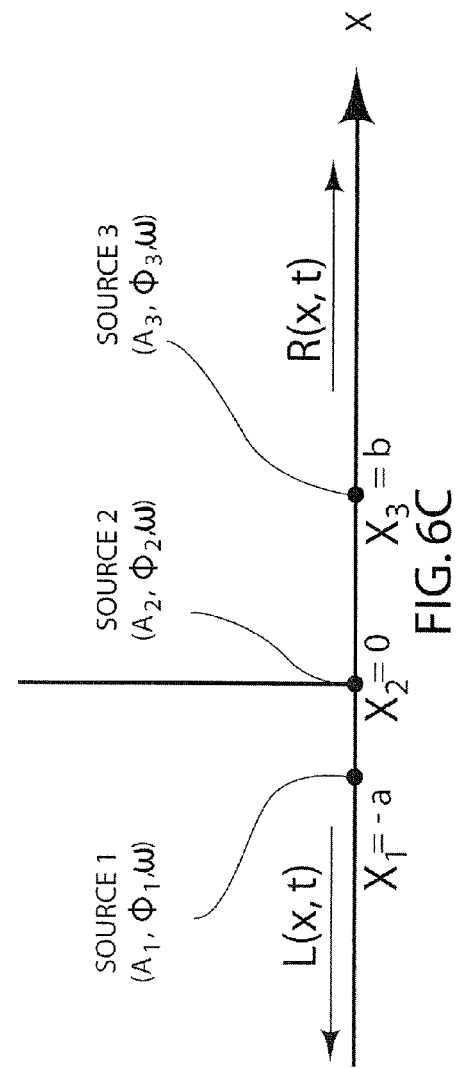

HIGH RETARDATION-AMPLITUDE PHOTOELASTIC MODULATOR

FIELD OF THE INVENTION

The present invention relates generally to photoelastic modulators and, more particularly to high retardation-amplitude photoelastic modulators.

BACKGROUND OF THE INVENTION

Birefringent optical materials exhibit a refractive index that varies with the direction of polarization of the incident light, and are characterized by the difference between the maximum and minimum values of the refractive index, and by the directions of polarization along principal axes corresponding to these extreme values. Retardation is the phase difference introduced between waves polarized along the principal axes resulting from travel through the birefringent material, and is proportional to the birefringence, the distance traveled by the light through the material, and to the frequency of the light. It may be expressed in "waves" at some given wavelength; that is, a phase difference of $2\pi$ radians times the number of "waves" at the given (vacuum) wavelength.

Isotropic materials such as fused silica and microcrystalline ZnSe are not birefringent, but can be induced to become birefringent by external factors, such as mechanical stress. This is known as the photoelastic effect. In an isotropic material, a strain (and the associated stress) along one direction causes the refractive index along that direction to change from the refractive index along a perpendicular direction and also from the refractive index in the absence of strain. These directions are the principal axes associated with the stress-induced birefringence. Linearly polarized light experiences one or the other value of the refractive index depending on whether its direction of polarization is parallel to or perpendicular to the direction of the strain. For intermediate directions of polarization, the electromagnetic wave can be resolved into two components along the principal axes, each component propagating with a phase velocity corresponding to the refractive index it experiences. This difference in phase velocity results in a phase difference (retardation) between the two components. When recombined, this results in a change of the state of polarization of the resulting light (See, e.g., "Piezo-Optical Birefringence Modulators: New Use for Long Known Effect" by J. C. Kemp, J. Opt. Soc. Am. 59, 950-954 (1969).).

Photoelastic modulators (PEMs) are optical devices that use the photoelastic effect to generate a time-dependent birefringence which can be used for modulating: (i) the state of polarization of light; or (ii) light intensity. Piezoelectric transducers (PZTs) may be used to apply mechanical stress to normally nonbirefringent materials. Since they have no internal moving parts, PZTs can operate at high frequencies; however, only small displacements may be generated at high-frequencies of operation (using reasonable driving voltages), unless resonant PEMs are used where small driving forces applied at the resonance frequency of the PEM may generate high stress oscillation amplitudes in the PEM (See, e.g., J. C. Kemp, supra.).

Conventional applications of PEMs require small retardation amplitudes, typically less than one wave at a specified wavelength (fused silica PEMs in the visible, and ZnSe, Ge, and Si in the infrared, as examples). A PEM having a retardation amplitude of a quarter-wave will convert linearly polarized incident light into circularly polarized light (alternatively right- and left-polarized at the peaks and troughs of the retardation), passing through elliptical polarizations between these polarizations. If a quarter-wave plate (which adds a fixed retardation of a quarter-wave) is introduced into the optical path, the total retardation (PEM plus plate) will oscillate between zero and one half-wave and, if properly oriented polarizers are placed on both sides of the optical system, the intensity of the emerging light will oscillate between zero and the incident intensity, thereby generating high-speed intensity modulation for monochromatic light. See, for example, "Photoelastic Modulators" a publication of HINDS Instruments, Inc. of Hillsboro, Oreg., wherein a rectangular bar of transparent photoelastic material is attached to a piezoelectric transducer such that the bar vibrates along its long dimension and the maximum of the oscillating birefringence effect is maximum at the center of the fused silica bar.

The input polarizer is assumed to be at 45° relative to the optical axes of the PEM, while the output polarizer can be either parallel, or perpendicular, to the input polarizer.

An interferometer may be constructed by introducing a phase difference between two linearly polarized optical waves with mutually orthogonal directions of polarization, and translating this difference into a light intensity value by means of a photoelastic modulator disposed between two polarizers, as described hereinabove. Such an interferometer can be used in a Fourier transform (FT) spectrometer (PEM/FT) (See, e.g., U.S. Pat. No. 4,905,169 for "Method And Apparatus For Simultaneously Measuring Fluorescence Over A Multiplicity Of Spectral Channels" which issued to Tudor N. Buican and John C. Martin on Feb. 27, 1990.).

PEM/FT spectrometers are capable of providing greater than $10^5$ interferograms/spectra scanned per second, as opposed to a few thousand scans/s available with the fastest non-PEM interferometers; however, achieving spectral resolutions useful in the mid-infrared (smaller than tens of cm$^{-1}$) is difficult. If individual PEMs are stacked together and are driven in phase in order that their retardation amplitudes are added, spectral resolutions of less than 10 cm$^{-1}$ should be achievable with multiple passes therethrough (See, e.g., U.S. Pat. No. 6,970,278 for "Controlling Resonant Photoelastic Modulators" which issued to Tudor N. Buican on Nov. 29, 2005.). However, because of light losses at the optical interfaces, such a system has a limited light throughput (estimated by the present inventor to be between 3-8%) which limits its usefulness in applications where the intensity of the light to be analyzed is low. This limitation may not be important in applications where either a high-intensity light source is available, or large-aperture collection optics can be used. However, in some applications, the intensity of the available light is small and few photons can be captured in the short time available to an ultra-high-speed instrument.

As a solution to this problem, the PEM may be fabricated out of a single, bar-shaped piece of optical material having suitable size and shape to replace an entire stack of individual PZT-driven PEMs. This may be thought of as bringing together the PEMs in the stack until they touch, and then removing the interfaces between touching windows, thereby leaving a bar of optical material with multiple PZTs positioned along its length, and with the light traveling along the long axis of the bar. However, this approach fails where the equivalent of the individual windows are no longer physically separated, but rather are in direct contact with each other in the bar, since elastic waves can now travel along the length of the bar. That is, the compression waves which travel from the PZTs perpendicular to the direction of light propagation will also propagate as elastic waves along the length of the bar in the direction of light propagation. Since the stresses in the elastic wave will integrate to zero over a full wavelength (period) of this wave, the only contribution to total retardation will come from the remainder of less than one wavelength from the division of the bar length by the wavelength of the elastic wave. In fact, the maximum contribution from an elastic wave propagating along the bar is that of one-half of its wavelength (since that gives the maximum integrated retardation, which then gradually falls to zero as the remainder increases beyond a half-wavelength of the elastic wave to a full wavelength, and subsequently repeats this oscillatory pattern as the total length of the bar continues to increase). Therefore, the retardation does not increase beyond this limit if the bar length is increased.

The same result obtains if a standing elastic wave is set up along the length of the bar, since the interfering elastic waves propagate through the points of zero amplitude (nodes), so that adjacent antinodes always oscillate with opposite phases. Consequently, the retardation integrates to zero over the length of two adjacent antinodes; that is, twice the separation between adjacent nodes, or one wavelength. The maximum total retardation along the bar axis is obtained for an odd number of antinodes; that is, the integral over the distance between two adjacent nodes, or one-half of a wavelength. Resonant standing elastic waves along the length of the bar created by reflection at the ends of the bar do not change this conclusion.

Although the bar in this invention is a three-dimensional (3-D) object, it operates as a waveguide for elastic waves which exhibit propagating modes only along the length of the bar. Therefore, the bar and the elastic waves propagating therein behave as if they were a one-dimensional (1-D) system: therefore, the phrase "essentially 1-D", as used throughout the Specification and claims, denotes this approximation (See, B. A. Auld, *Acoustic Fields And Waves In Solids*, Vol. II, $2^{nd}$ Ed., Krieger Publishing Co., 1990.)

Low retardation, bar-shaped PEMs using birefringence generated from a standing elastic wave along the length of the bar where the path of the light propagating through the bar and perpendicular to its long axis, has been deliberately placed a distance from the vicinity of the PZTs and the perturbing static birefringence caused by static stresses due, for example, to affixing the PZTs to the optical element, are known. See, for example, "New Design For A Photoelastic Modulator" by J. C. Canit and J. Badoz, App. Opt. 22, pp. 592-594 (1983); "Low Frequency Photoelastic Modulator" by J. C. Canit and C. Pichon, App. Opt. 23, pp. 2198-2200 (1984); and D. Yang et al. in "Photoelastic Modulator: Polarization Modulation And Phase Modulation, J. Opt. (Paris) 26, pp. 151-159 (1995).

SUMMARY OF THE INVENTION

Accordingly, it is an object of the present invention to provide an elongated photoelastic modulator, wherein polarized light traveling in the long direction thereof and with its direction of polarization parallel to a principal axis of the modulator experiences an integrated retardation that increases with increasing length of the photoelastic modulator.

Another object of the present invention is to provide an elongated photoelastic modulator, wherein polarized light traveling in the long direction thereof and with its direction of polarization parallel to a principal axis of the modulator experiences an integrated retardation that increases with increasing length of the photoelastic modulator for use in interferometry.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the high retardation-amplitude photoelastic modulator, hereof, includes in combination: a photoelastic element having a first end, an opposing second end, an optical axis passing through the first end and the second end, and a surface disposed between the first end and the second end; at least one active cell including: two spaced-apart first mechanical drivers affixed to the surface and having a first chosen distance therebetween along the optical axis; and a second mechanical driver affixed to the surface of the photoelastic element at a second chosen distance from one of the two first mechanical drivers along the optical axis and between the two first mechanical drivers; first means for driving one of the two first mechanical drivers; second means for driving a second of the two first mechanical drivers; third means for driving the second mechanical driver, wherein a standing elastic wave having a node along the optical axis at positions corresponding to each of the two first mechanical drivers, and an antinode along the optical axis between the nodes, and confined to the at least one active cell is generated, and wherein induced birefringence is produced along the optical axis in the at least one active cell between the two first mechanical drivers; and means for directing linearly polarized optical radiation along the optical axis, the optical radiation having an initial phase and a direction of polarization parallel to a principal axis, whereby the initial phase of the optical radiation is monotonically retarded as the optical radiation propagates along the optical axis within the at least one active cell.

In another aspect of the present invention and in accordance with its objects and purposes, the method for generating high retardation-amplitude in electromagnetic radiation traveling through a photoelastic modulator, hereof, includes the steps of: generating a standing elastic wave in a photoelastic element along an optical axis thereof using two first mechanical drivers attached to the surface thereof and spaced apart at a first chosen distance along the optical axis, and a second mechanical driver disposed between the first mechanical drivers at a chosen distance along the optical axis from one of the first mechanical drivers, the two first mechanical drivers and the second mechanical driver forming an active cell, whereby an antinode in the elastic wave is formed on the optical axis between nodes formed on the optical axis at the positions corresponding to the two first mechanical drivers, birefringence is produced along the optical axis of the active cell between the two first mechanical drivers, and the elastic wave is confined to the cell; and directing linearly polarized optical radiation along the optical axis, the optical radiation having an initial phase and a direction of polarization parallel to the first principal axis, whereby the initial phase of the optical radiation is monotonically retarded as the optical radiation propagates along the optical axis within the active cell.

In yet another aspect of the present invention and in accordance with its objects and purposes, the interferometer, hereof, includes in combination: a photoelastic element having a first end, an opposing second end, an optical axis passing through the first end and the second end, and a surface disposed between the first end and the second end; at least one active cell comprising: two spaced-apart first mechanical drivers affixed to the surface and having a first chosen distance therebetween along the optical axis; and a second mechanical driver affixed to the surface of the photoelastic element at a second chosen distance from one of the two first mechanical drivers along the optical axis and between the two first mechanical drivers; first means for driving one of the two first mechanical drivers; second means for driving a second of the two first mechanical drivers; third means for driving the second mechanical driver, wherein a standing elastic wave having a node along the optical axis at positions corresponding to each of the two first mechanical drivers, and an antinode along the optical axis between the nodes and confined to the at least one active cell, is generated, and wherein induced birefringence is produced along the optical axis in the at least one active cell between the two first mechanical drivers; a first polarizer having a first axis of polarization at 45° relative to the direction of a principal axis of the photoelastic element; a second polarizer having a second axis of polarization at 45° relative to the direction of the principal axis; and means for directing optical radiation along the axis, such that the optical radiation passes through the first polarizer and emerges linearly polarized along the first axis of polarization before entering the photoelastic material in which two linearly polarized components of the optical radiation are generated, a first component parallel to the principal axis of the induced birefringence having a first phase and a second component perpendicular to the first component and having a second phase, the first phase being monotonically retarded relative to the second phase as the optical radiation propagates through the at least one active cell, and such that the first component and the second component pass through the second polarizer and emerge therefrom as third linearly polarized optical radiation and fourth linearly polarized optical radiation both having a direction of polarization parallel to the second polarization axis, the third optical radiation and the fourth optical radiation having the relative phase retardation as that after exiting the photoelastic material.

The embodiments of the present invention overcome the disadvantages and limitations of a stack of isolated resonators oscillating at their fundamental frequencies which include the requirement of a set of expensive finished windows having prohibitive light losses. The benefits and advantages thereof include, but are not limited to, providing a low-light loss photoelastic modulator having the potential for arbitrarily high birefringence; that is, a birefringence that increases with increasing length of the photoelastic bar, but that may have limitations related to the complexity, cost and inefficiencies inherent in a very long bar having a large number of piezoelectric transducers.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1A is a schematic representation of an active cell of an embodiment of the photoelastic modulator of the present invention illustrating that a cell including two node drivers separated by $\lambda/2$ with an antinode driver in between for generating an elastic wave, where the node drivers oscillate in phase and lead the antinode driver by $\pi/2$, generates an elastic wave on the optical axis which is confined to the cell, while FIG. 1B shows that the same effect may be generated by a single source and two reflecting walls.

FIG. 6A shows the one-dimensional position, $X_0$, of a single driver (source) along the optical axis (X-direction) of a photoelastic material and having amplitude $A_0$, phase $\phi_0$, and frequency $\omega$, generating wave $L(x,t)$ propagating to the left and wave $R(x,t)$ propagating to the right along the X-axis, FIG. 6B shows the one-dimensional positions of N drivers (sources) along the optical axis (X-direction) of a photoelastic material, each driver having amplitude $A_n$, phase $\phi_n$, and frequency $\omega$, along with the generated wave $L(x,t)$ propagating to the left and wave $R(x,t)$ propagating to the right along the X-axis, while FIG. 6C shows the locations of three unequally spaced drivers (sources) along the X-axis, where driver 1 is located a distance "a" from driver 2, and driver 2 is located a distance "b" from driver 3.

FIG. 7A illustrates two point oscillating drivers (sources) separated by $\lambda/4$ and oscillating in quadrature, with the source on the right lagging behind the source on the left by $\pi/2$, while

FIG. 8A is a graph of the amplitude of an elastic standing wave in an active resonance cell as a function of distance where the node drivers are located at $\pm\lambda/4$ and the antinode driver is disposed at the origin, and with an attenuation coefficient of 0.5 per wavelength, while

FIG. 9A is a graph of the amplitude of an elastic standing wave in a conventional passive resonator as a function of distance where the perfectly reflecting walls are located at $\pm\lambda/4$ and there is no attenuation, while

10B is a graph of the phase of the elastic standing wave as a function of distance for the same location of the sources.

Figure 8A:
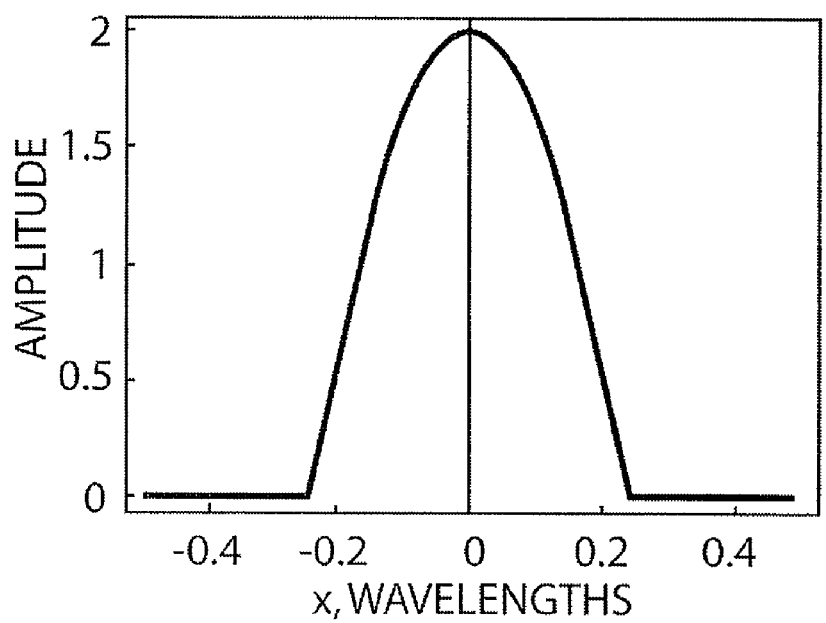
Figure 11A:
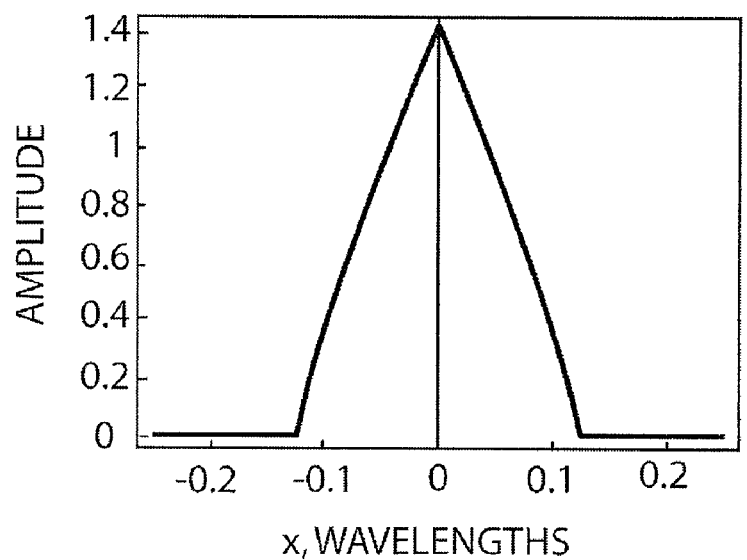
Figure 11B:
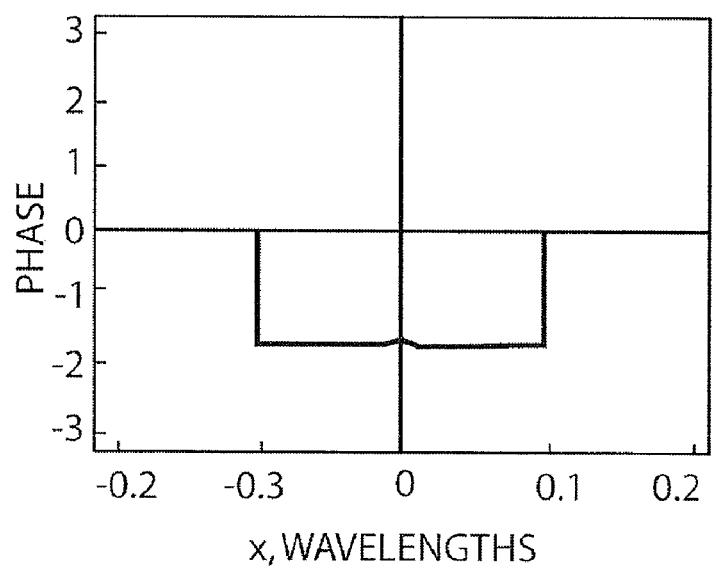

FIG. 11A is a graph of the amplitude of an elastic standing wave in an active resonance cell as a function of distance for a resonance cell one-half as wide as that in FIG. 8A (a=$\lambda$/8, and b=$\lambda$/8), while FIG. 11B is a graph of the phase of the elastic standing wave as a function of distance for the same location of the sources.

Figure 12A:
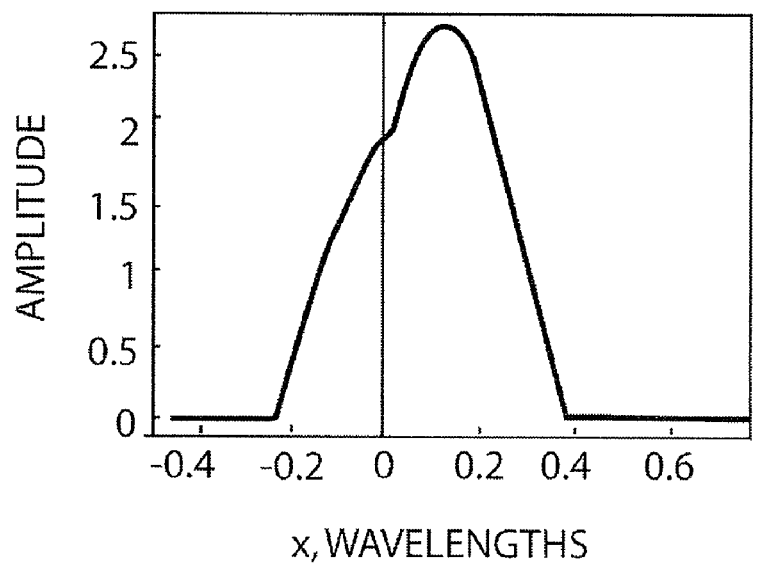
Figure 12B:
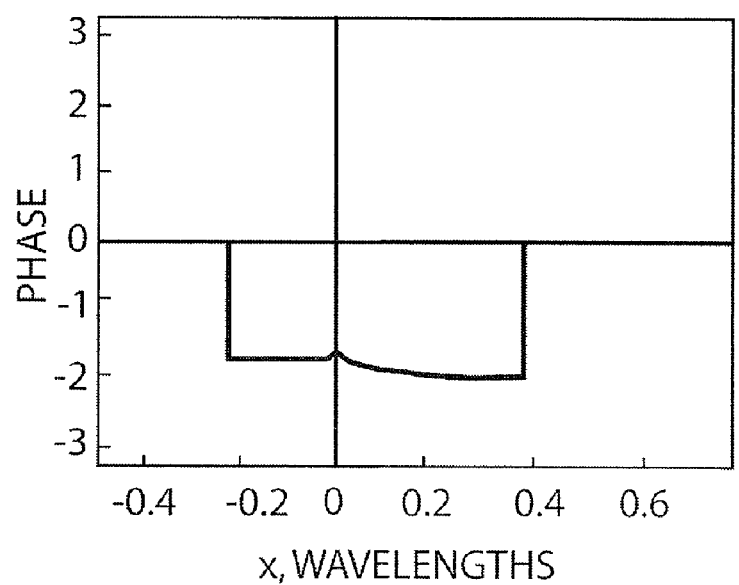

FIG. 12A is a graph of the amplitude of an elastic standing wave in an asymmetric active resonance cell as a function of distance where sources 1 and 2 are separated by 0.45 half-wavelengths and sources 2 and 3 are separated by 0.75 half-wavelengths ($x_1$=0.225$\lambda$; $x_2$=0; $x_3$=0.375$\lambda$), for a total acoustic resonance cell length of 1.2 half-waves (20% greater length than for a fundamental resonator), and an attenuation coefficient of 0.5 per wavelength, while FIG. 12B is a graph of the phase of the elastic standing wave as a function of distance for the same location of the sources.

DETAILED DESCRIPTION OF THE INVENTION

Briefly, the present invention includes an apparatus and method for providing a high retardation-amplitude photoelastic modulator. Mechanical oscillations are driven in a continuous elongated bar of photoelastic optical material such that contiguous domains in the bar are separated by short regions of approximately zero oscillation amplitude (nodes), and are independent from each other, whereby the phase of the elastic wave oscillation in each domain may be controlled externally and is unaffected by the phase of adjacent domains. In particular, the phase of the oscillations does not change significantly across the nodes and linearly polarized light propagating through the bar experiences increasing phase retardation. Within the short node regions, the phase may change sign; however, the amplitude of the oscillations is small or zero in these regions, and the effect on the phase retardation of the propagating light will be correspondingly small.

The elastic wave oscillations may be driven by a phased array of quasi-periodically spaced piezoelectric transducers (PZT) affixed along the surface of the photoelastic modulator (PEM) forming nodes and antinodes in the elastic waves in the photoelastic material. Resonant elastic standing waves may be generated. The phase of each PZT is controlled in accordance as described in detail hereinbelow. The desired elastic wave distribution along the bar is created by controlling the phase, amplitude and spacing of the individual PZTs. The term "node" along an essentially 1-D system where the amplitude of the oscillation vanishes, traditionally refers to a standing wave which results from the cancellation of waves propagating in opposite directions, and waves may actually propagate through a node. In the present situation, the nodes are the result of the local oscillation produced by a node driver actively and adaptively canceling the sum of all incoming waves as might occur in standard vibration cancellation systems.

Vibration cancellation in an essentially 1-D system (such as the present bar-shaped PEM) is known. One procedure may utilize individual vibration cancellation controllers for the node drivers, without global control of all of the nodes. The node drivers thus isolate the antinode drivers by actively preventing the propagation of elastic waves between adjacent antinodes, thereby functioning like physically separate PEMs in an array of PEMs. The antinode drivers may be controlled by an array control system based, for example, by the "Floating Amplitude" method for controlling both the retardation amplitude and the operating frequency thereof, which frequency is not necessarily a resonant frequency of individual PEMs in an array, as described in U.S. Pat. No. 6,970,278 for "Controlling Resonant Photoelastic Modulators" which issued to Tudor N. Buican on Nov. 29, 2005. This ensures that all points between nodes oscillate with the same frequency and phase, and all retardations constructively add.

As used throughout the Specification and claims, the term "node driver" or "antinode driver" shall designate at least one driver and, more particularly, at least one piezoelectric driver, affixed on the surface of the photoelastic bar at substantially the same location along the long axis (optical axis) of the bar on different faces thereof or the equivalent for non-rectangular bars, and having specific phase relationships therebetween.

Figure 1:
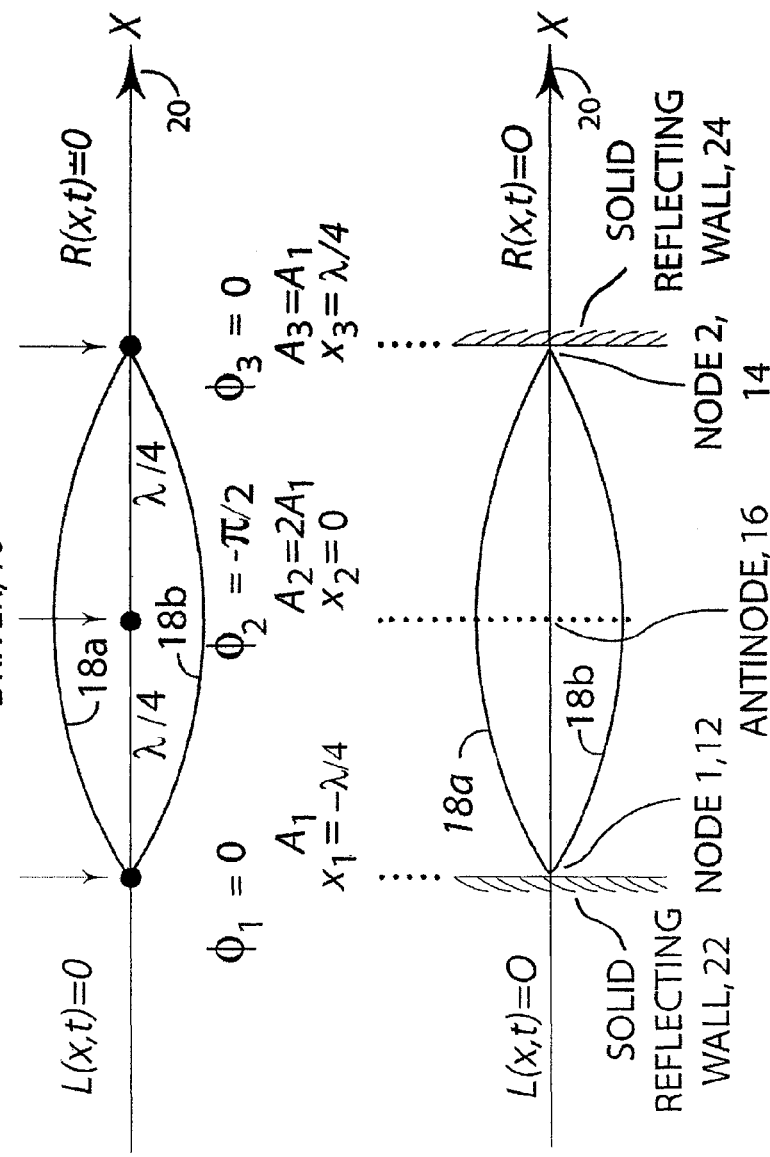

Reference will now be made in detail to the present embodiments of the invention, examples of which are illustrated in the accompanying drawings. In the FIGURES, similar structure will be identified using identical reference characters. Turning now to FIG. 1A, shown is a schematic representation of an active resonance cell, 10, of an embodiment of the photoelastic modulator of the present invention illustrating a cell including two node drivers (sources), 12, 14, separated by $\lambda$/2, with antinode driver, 16, in between, where the node drivers oscillate in phase and lead the antinode driver by $\pi$/2, such that an elastic standing wave, 18, is generated on optical axis, X, 20, and confined to the cell (shown as left traveling wave, L(x,t)=0 and right traveling wave, R(x,t)=0), where $\lambda$ is the wavelength of the elastic wave 18a, 18b (showing the maximum and minimum values of the amplitude of the standing elastic wave as a function of the distance along the cell, respectively), generated by drivers transmitting a periodic signal having fundamental frequency, $\omega$, into the photoelastic material, while FIG. 1B shows that the condition where there is no wave propagating out of cavity may be generated by a single source 16 and two reflecting walls, 22 and 24. At least one beam of linearly polarized light having an initial phase is caused to propagate along optical axis 20.

With each cell being configured in this manner, the linearly polarized light experiences birefringence as it propagates along the optical axis such that a monotonic phase retardation is generated. The confinement of an elastic wave to each active cell permits adjacent cells to be controlled independently, and the phase retardation to be at least in theory, arbitrarily increased. This is in contrast with the situation where a single standing elastic wave is generated in a photoelastic material. There, the elastic wave changes sign (phase change of $\pi$) as it propagates through a node such that the total retardation produced by every pair of adjacent antinodes is zero, and the total retardation of a bar cannot exceed that generated by one-half wave of the elastic standing wave (one antinode), no matter how long the bar is made.

Figure 2:
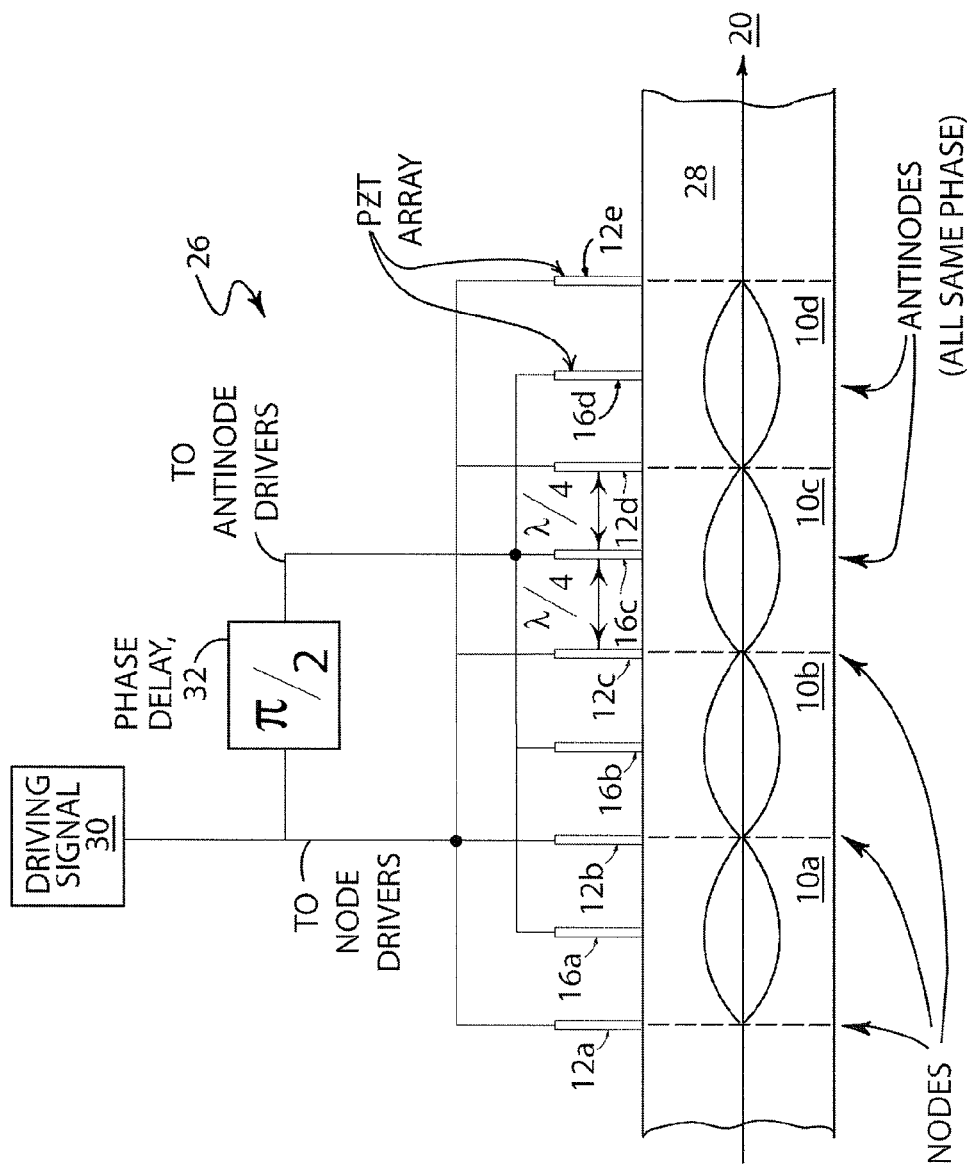
FIG. 2 is a schematic representation of a side view of multiple cells of the type illustrated in FIG. 1A hereof disposed in tandem, each cell sharing one node driver with an adjacent cell, FIG. 2 showing further that the node and node drivers in the form of piezoelectric transducer are affixed to the surface of an elongated photoelastic bar and generate elastic waves having nodes and antinodes along the optical axis of the bar corresponding to the positions of the drivers for the indicated spacing and phases of the drivers such that the retardation amplitude increases as the light propagates therethrough.

FIG. 2 is a schematic representation of a side view of multiple active resonance cells, 10a-10d, of the type illustrated in FIG. 1A hereof disposed in tandem, each cell sharing one node driver with an adjacent cell, and forming one embodiment of the photoelastic modulator, 26, of the present invention. FIG. 2 illustrates further that the node drivers 12a-12e and the antinode drivers, 16a-16d, shown as piezoelectric transducers in FIG. 2, are affixed to the surface of an elongated photoelastic bar, 28, and generate elastic waves having nodes and antinodes along the optical axis 20 of the bar corresponding to the positions of the node drivers and antinode drivers, respectively, where the spacing of $\lambda$/4 (each of the node and antinodes being driven at a periodic frequency $\omega$ corresponding to wavelength $\lambda$) between nodes and antinodes (node drivers and antinode drivers) and phases of the antinode drivers lagging those of the node driver by $\pi$/2 such that the retardation amplitude of light traveling along optical axis 20 along the long axis of a bar of photoelastic material 28 increases as the light propagates therethrough. Since transducers 12 and 16 have physical dimensions and are affixed by some manufacturing process of necessarily limited accuracy, their corresponding positions along axis 20 are approximate. However, as will be demonstrated hereinbelow where both elastically lossy and lossless systems will be analyzed, the positions and relative phases of the node drivers and antinode drivers need only be approximate for this effect to be observed, the positional errors being compensated for by suitable adjustments in driver phase and amplitude. Through closed-loop control, one may also compensate for variability of the frequency response of the drivers which may generate variability in their phases.

Signal generator, 30, serves as the means for providing periodic electrical signals to node drivers 12a-12e and antinode drivers 16a-16d with a phase delay being introduced by phase delay apparatus, 32. As stated hereinabove, standing elastic waves have been generated along chosen optical axes of bar-shaped PEMs from piezoelectric transducers affixed to the surface thereof (See, e.g., J. C. Canit and J. Badoz, supra.). The phases of the standing waves in cells 10a-10d of photoelastic modulator 26 are independent of each other and may be made approximately equal by the driving electronics, thereby ensuring that the retardation amplitude increases as light propagates along optical axis 20 of photoelastic material 28. The cross section of photoelastic material 28 may have arbitrary shape as long as the PZTs can be effectively affixed to the outer surface thereof. However, PZTs are more readily adapted to bars having flat sides.

As stated hereinabove, (Quasi)periodic attachment of piezoelectric transducers to a bar-shaped optical element, may be considered to form a phased array of (ultrasonic) transducers since the desired oscillation amplitude distribution along the bar is created by controlling the phase (and amplitude) of the individual PZTs. Because alternate PZTs have different phases and roles in creating the spatial distribution of oscillations, two interdigitated phased arrays, one consisting of node drivers, and the other of antinode drivers, are generated.

As also stated hereinabove, the node drivers (PZTs with associated electronics means for driving the PZTs) may be regarded as examples of vibration cancellation. In a 1-D system, or one that is essentially one-dimensional, active vibration cancellation can be achieved by a feedback loop that is adjusted to minimize the amplitude of a signal detected by a downstream sensor. This results in the cancellation of the incoming wave by a suitable wave generated by an upstream PZT driver. The same PZT may be used for sensor and wave generator (driver) functions.

Figure 3:
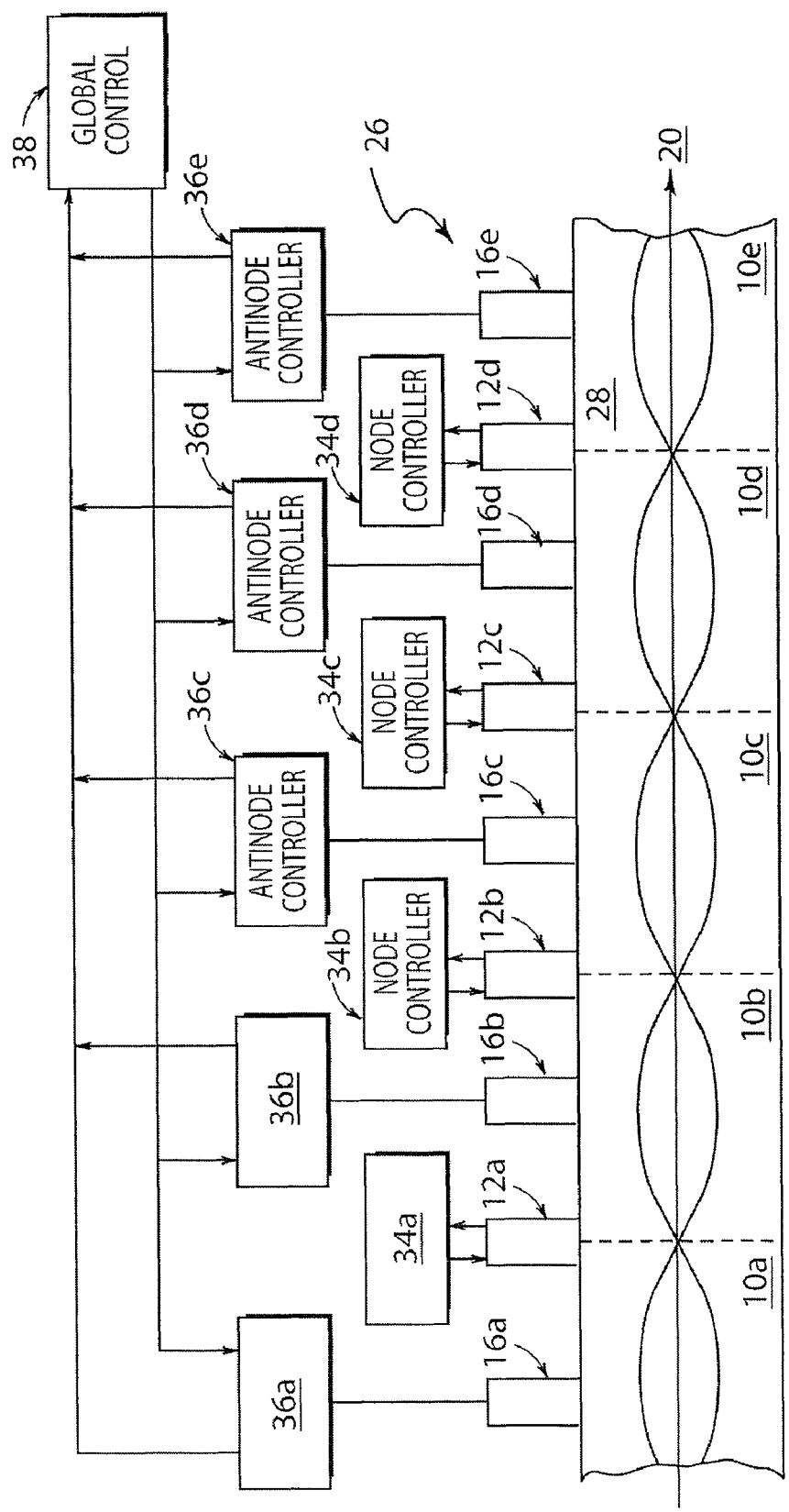
FIG. 3 is a schematic representation of the side view of an apparatus for active vibration cancellation in the essentially one-dimensional elongated photoelastic medium shown in FIG. 2 hereof in order to reduce the propagation of elastic waves out of an individual cell, each node driver being part of a feedback loop for providing a restoring signal if a signal is detected at the node.

FIG. 3 is a schematic representation of the side view of an embodiment of the photoelastic modulator 26 of the present invention, using active vibration cancellation in an essentially 1-D bar of photoelastic material 28. A particular node PZT (12a-12d) may perform both as a driver and as a sensor. In a 1-D system, if the amplitude is zero at the sensor node, it is zero everywhere downstream and the PZT driver acts as a (perfect) reflector for the wave propagating from upstream. The amplitude at a node sensor and downstream therefrom will generally be small but not zero, the result of an effective but not perfect reflector. Therefore, if a non-zero signal is detected by any of PZTs 12a-12d, independent node controllers, 34a-34d, respectively, may generate a restoring signal on PZTs, 12a-12d, respectively, to effectively cancel this signal. This also obtains in an essentially 1-D system. The advantage of the active vibration cancellation apparatus over global phase and amplitude control in isolating the active cells 10a-10e is that the control is local and may therefore be implemented by an array of distributed independent controllers, each operating only on the basis of the error signal detected by a local sensor or, at the most, from neighboring sensors. The number of drivers and local vibration cancellation circuits may be proportional to the length of photoelastic bar 28. Antinode controllers, 36a-36e, may be controlled by global controller, 38. An alternative procedure may be to provide a central controller for receiving error signals from each of the sensors (all the cells), processing them all, and generating drive amplitudes and phases for each PZT. However this approach is onerous and does not scale well, as the number of inputs and outputs for the central controller increases in proportion to the number of resonance cells.

Figure 4A:
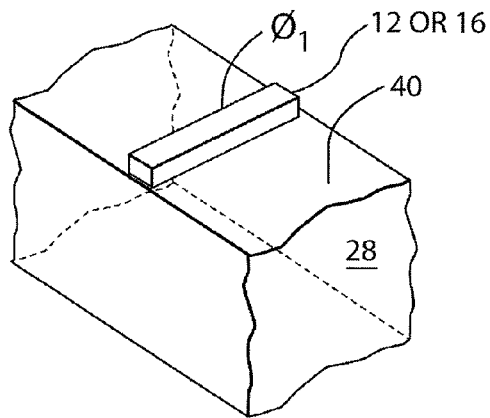
FIG. 4A is a schematic representation of perspective view of a node or antinode driver affixed to the surface of a photoelastic bar.
Figure 4B:
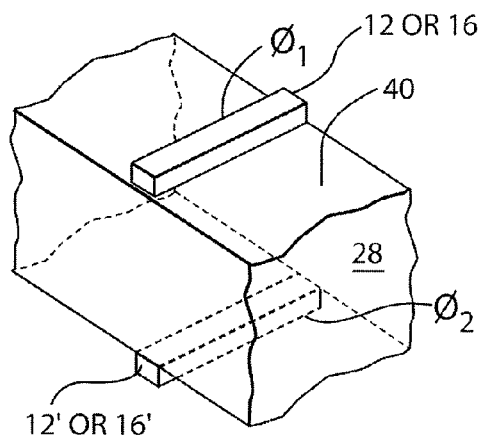
FIG. 4B shows opposing node or antinode drivers affixed to the surface of a photoelastic bar.
Figure 4C:
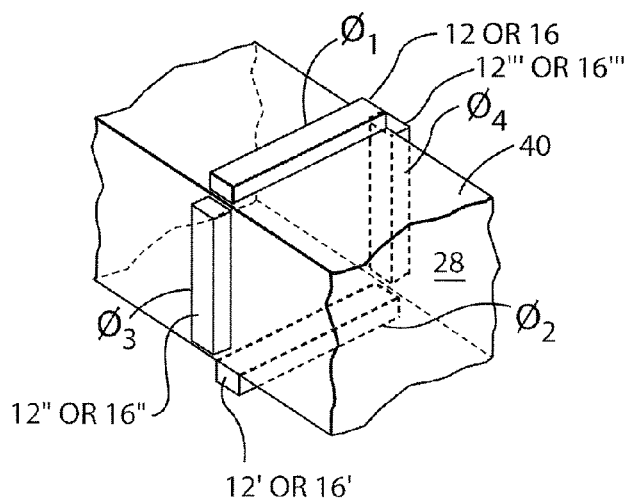
FIG. 4C shows four node or antinode drivers affixed to the surface of a photoelastic bar.

FIGS. 4A-4C are schematic representations of perspective views of photoelastic bar 28 having one PZT driver (12 or 16) having phase $\phi_1$, two opposing PZT drivers (12 or 16 having phase $\phi_1$ and 12' or 16' having phase $\phi_2$), or four PZT drivers (12 or 16 having phase $\phi_1$; and 12' or 16' having phase $\phi_2$; and 12" or 16" having phase $\phi_3$; and 12''' or 16''' having phase $\phi_4$), respectively, affixed to surface, 40, thereof. Symmetric and planar deployment of the drivers is shown, although other configurations may be envisioned. Piezoelectric transducers may be deployed in pairs corresponding to opposing faces (FIG. 4B), where phases $\phi_1=\phi_2$ in order that a compression wave may be generated along the axis of the bar, or they may differ by $\pi$ as, for example, $\phi_1=\phi_2+\pi$, in order that a vertically polarized shear elastic wave may be generated. The same considerations apply to $\phi_3$ and $\phi_4$ of FIG. 4C, with the shear elastic wave being horizontally polarized in this situation. The phases may have chosen relationships to each other. As an example, $\phi_1=\phi_2$ and $\phi_3=\phi_4$ with $\phi_1=\phi_3+\pi$ (opposite phases between the two pairs of PZTs), resulting in transverse vertical and horizontal stresses having opposite sign, which would generate a large birefringence for light propagating along the long axis of the bar.

Once the internal phase relationships have been defined for each node driver and antinode driver (such as the three phase relationships identified hereinabove), there remains one free phase parameter. Assuming the drivers to be PZTs, the remaining free phase parameter corresponds to the "phase" of the driver as used throughout the present Specification and claims.

Figure 5:
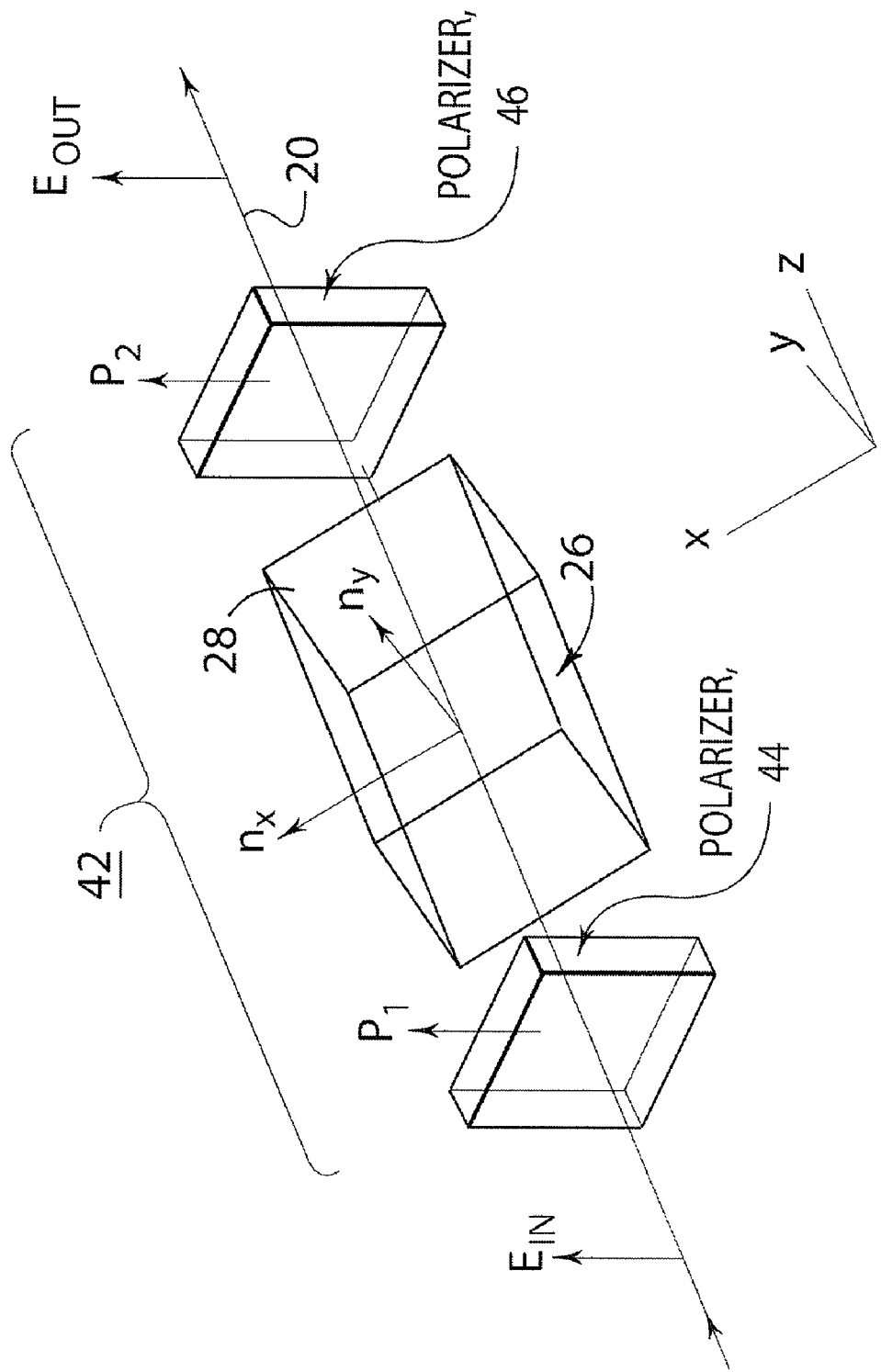
FIG. 5 is a schematic representation of a perspective view of an embodiment of a portion of an interferometer suitable for use with the photoelastic modulator of the present claimed invention.

In its most basic form, a PEM-based interferometer, 42, is shown in FIG. 5, and includes first polarizer, 44, photoelastic modulator, 26, and second polarizer, 46, where $E_{in}$ and $E_{out}$ represent the input and output electric vectors as determined, respectively, by the directions of polarization of first and second polarizers 44 and 46; $n_x$ and $n_y$ are the principal indices of refraction of the photoelastic material 28 and the corresponding principal axes which are oriented at 45° relative to the directions of polarization of the polarizers. A linearly polarized (vertically polarized after exiting the first polarizer, $P_1$) optical wave entering the photoelastic modulator is resolved into two, linearly polarized orthogonal optical waves, with respective polarizations along the x and y axes. A phase retardation is introduced between the two waves as they propagate through the photoelastic modulator because of the different values of the refractive indices, $n_x$ and $n_y$, each encounters. Upon exiting photoelastic modulator 26, the two waves pass through second polarizer 46 which only transmits components linearly polarized along the direction of polarization thereof ($P_2$). The emerging waves can interfere since they now have the same direction of polarization and the phase difference introduced by the photoelastic modulator. This phase difference varies in time following the induced birefringence in the modulator. See, e.g., T. N. Buican, A. H. Carrieri, "Ultra-High Speed Solid State Spectroscopy and Applications for Chemical Defense," Proceedings of the 24$^{th}$ Army Science Conference, Orlando, Fla., 2004, and U.S. Pat. No. 4,905,169, supra. Optics suitable for multiple passages of light through PEM 26 (not shown in FIG. 5) for achieving higher retardation amplitude therefrom with consequent increase in instrument resolution may be provided.

A static birefringence phase shifter is an optical element having a (fixed, but adjustable) birefringence equal to the retardation amplitude of the PEM, thereby shifting the origin of the interferogram by one full amplitude, may be provided such that the interferogram reaches a maximum retardation (twice the amplitude) with the result that the spectral resolution of a Fourier Transform Spectrometer employing this arrangement is doubled (with a doubling of the interferogram scan time as well). Alternatively, the static stress level of the PEM may be controlled by adding a DC voltage component to the voltage applied to the PZTs used for driving stress waves in the PEM.

Having generally described the invention, the following EXAMPLES will provide more detail therefor.

EXAMPLE 1

Active Wave Containment

FIG. 6A shows a point source that generates a wave that propagates in a medium along the x-axis and that has an amplitude, A(x), phase, φ(x), angular frequency ω, and attenuation β. Waves propagating to the left and right of the interval are given by:

$$L(x,t) = A_0 e^{i\phi_0} e^{i(\omega t + \kappa(x-x_0))} = A_0 e^{i(\omega t + \kappa(x-x_0))}, \text{ and}$$

$R(x,t) = A_0 e^{i\phi_0} e^{i(\omega t - \kappa(x-x_0))} = A_0 e^{i(\omega t - \kappa(x-x_0))}$ where $A_0 = A(x_0)$, $\phi_0 = \phi(x_0)$ are respectively the amplitude and phase of the left- and right-propagating waves at the source, $A_0 = A_0 e^{i\phi_0}$ is the complex amplitude of the two waves at the source, ω is the angular frequency of the oscillation, and κ is the complex wavenumber $\kappa = \omega/c - i\beta = 2\pi/\lambda - i\beta = k - i\beta$, where c is the phase velocity of the waves along the x axis, β is the attenuation coefficient, λ is the wavelength of the elastic wave, and $k = 2\pi/\lambda$ is the (real) wavenumber.

FIG. 6B shows a set of N point sources positioned at $x_j$ (i=1, ... N), oscillating with the same angular frequency ω and generating N waves having amplitudes and phase, $A_j$ and $\phi_j$, at their respective sources and propagating through the medium with an attenuation coefficient β. The resultant waves propagating to the left and to the right of the set of N sources are:

$$L(x,t) = e^{i(\omega t + \kappa x)} \sum_{j=1}^{N} A_j e^{-i\kappa x_j}, \text{ and} \qquad [1]$$

$$R(x,t) = e^{i(\omega t - \kappa x)} \sum_{j=1}^{N} A_j e^{i\kappa x_j}.$$

Partial active containment, in which there is no propagation of the elastic wave on one side of the set of sources, corresponds to only one of the external resultant waves in Equation 1 cancelling identically. For example, if there is no external wave propagating to the left, L(x,t)=0, then, in vector notation, $$[e^{-i\kappa x_1} \; \ldots \; e^{-i\kappa x_N}] \begin{bmatrix} A_1 \\ \ldots \\ A_N \end{bmatrix} = 0 \qquad [2]$$

This vector equation has nonzero solutions for N≧2.

In order for both the waves to the left and to the right of the N sources to vanish identically, the two sums in Equation 1 must vanish, $$\sum_{j=1}^{N} A_j e^{-i\kappa x_j} = \sum_{j=1}^{N} A_j e^{i\kappa x_j} = 0,$$

or in vector notation:

$$\begin{bmatrix} e^{-i\kappa x_1} & \ldots & e^{-i\kappa x_N} \\ e^{i\kappa x_1} & \ldots & e^{i\kappa x_N} \end{bmatrix} \begin{bmatrix} A_1 \\ \ldots \\ A_N \end{bmatrix} = 0 \qquad [2a]$$

The 2×N matrix of complex exponentials is determined by the position of the N sources, the frequency of oscillation of the sources, and the attenuation coefficient of the medium. The N complex amplitudes are the unknowns; a nonzero solution of Equation 2 always exists for N≧3; for two sources, the determinant of the corresponding 2×2 matrix must vanish in order for a nonzero solution to exist. The nonzero solution provides the amplitudes and phases required for each of the N sources so that the elastic wave is actively contained within the set of sources; that is, there is no wave escaping to the left of source 1 or to the right of source 2, and L(x,t) and R(x,t)=0.

EXAMPLE 2

Active Reflector

For N=2, Equation 2 can be written as:

$$-A_2/A_1 = -e^{i\kappa(x_2-x_1)} = e^{i(k(x_2-x_1)+\pi)} e^{\beta(x_2-x_1)}.$$

In terms of amplitudes and phases, this is equivalent to $A_2/A_1 = e^{\beta(x_2-x_1)}$ and $\phi_2 - \phi_1 = k(x_2-x_1)+\pi$. These relationships between the amplitudes and the phases of the two sources result in no wave propagating to the left of source 1. In particular, for a source separation of a quarter wavelength, $x_2 - x_1 = \lambda/4$, and no attenuation (β=0), the condition for containment to the left is $A_1 = A_2 = A$ (equal amplitudes) and $\phi_2 - \phi_1 = -\pi/2$; that is, the second source must lag in phase by π/2 relative to the first source.

Figure 7A:
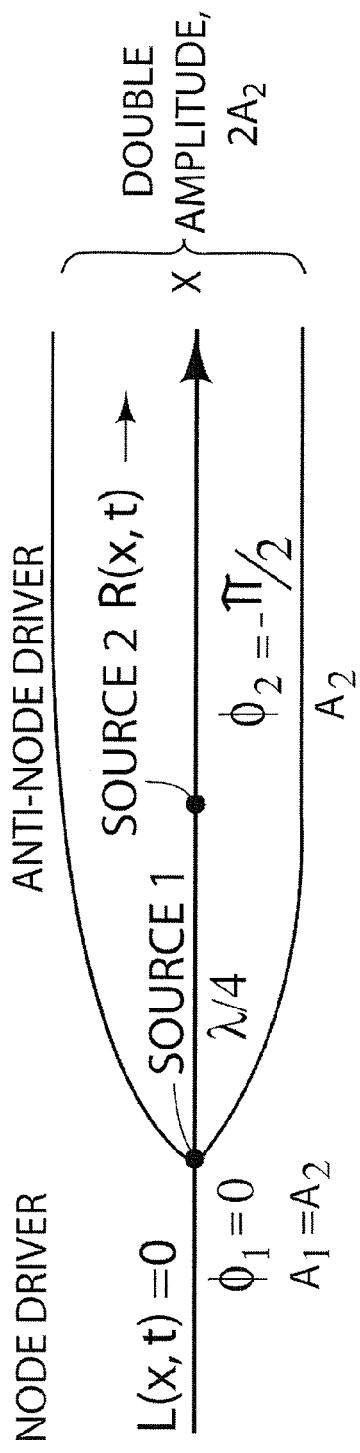
Figure 7B:
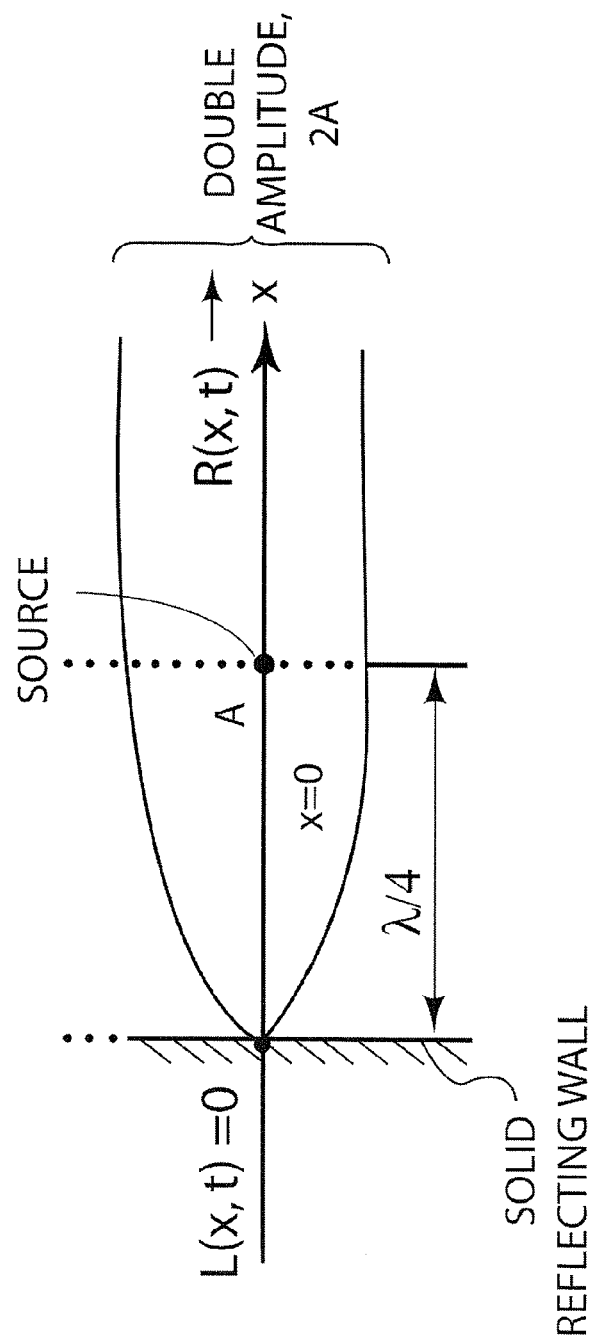
FIG. 7B shows the effect of source 1 as being the same as that of a solid reflecting wall for the elastic wave.

FIG. 7A shows two such point sources oscillating in quadrature, and separated by π/4, where the second source lags in phase by π/2 behind the first source. Thus, the wave to the left of the source vanishes, while the right propagating wave has an amplitude which, in the absence of attenuation, is the sum of the two source amplitudes, the sources adding constructively provided that there is no attenuation. Outside the source interval, then, the two point sources are equivalent to a single source on the right, and a solid wall to the left where the first source is located. The left source blocks transmission to the left, creates a standing wave between it and the right source, and increases the amplitude of the wave traveling to the right. As shown in FIG. 7B, source 1, oscillating with the appropriate amplitude and phase relative to source 2, is functionally equivalent to a reflecting wall or mirror that prevents the propagation of the wave generated by source 2 past source 1. This virtual "active mirror" effect is known and used in active noise cancellation discussed hereinabove.

EXAMPLE 3

Isolated Active Resonant Cell

If Equation 2a has a nonzero solution, then both waves propagating outside the region containing sources vanish and the elastic wave is contained within a bounded region which, under the right conditions, will act as a virtual active resonator. This is called and Active Resonance Cell, or ARC.

For two sources N=2, the vector equation 2a has nonzero solutions if and only if the determinant of the 2×2 matrix of exponentials vanishes:

$$\det\begin{bmatrix} e^{-i\kappa x_1} & e^{-i\kappa x_2} \\ e^{i\kappa x_1} & e^{i\kappa x_2} \end{bmatrix} = e^{i\kappa(x_2-x_1)} - e^{-i\kappa(x_2-x_1)} = 0,$$

which holds if and only if $\beta=0$ (no attenuation), and $x_2-x_1=n\lambda/2$ (the standard standing wave condition for two mirrors placed at $x_1$ and $x_2$). In other words, active wave confinement for N=2 requires strict geometric and propagation conditions if oscillations are to be confined to the region defined by the two sources. The geometric condition is identical to that for a standard resonant cavity between two mirrors; further, oscillations will not be confined if there is a non-zero attenuation coefficient even if the sources are exactly positioned.

However, as will be observed below, if N>2, these geometric and propagation conditions no longer represent constraints, and confinement of oscillations may be achieved by adjusting the driver parameters amplitude and phase, which can be achieved by purely electronic means.

FIG. 6C shows the simplest such situation, N=3, where three sources having complex amplitudes $A_1$, $A_2$, and $A_3$, are placed respectively at $x_1=-a$, $x_2=0$, and $x_3=b$. From Equation 2, confinement of the oscillations to the interval (−a,b) requires that $$\begin{bmatrix} e^{i\kappa a} & \ldots & e^{-i\kappa b} \\ e^{-i\kappa a} & \ldots & e^{i\kappa b} \end{bmatrix} \begin{bmatrix} A_1 \\ A_2 \\ A_3 \end{bmatrix} = 0, \text{ or}$$

$$\begin{aligned} e^{i\kappa a}A_1 + A_2 + e^{-i\kappa b}A_3 &= 0 \\ e^{-i\kappa a}A_1 + A_2 + e^{i\kappa b}A_3 &= 0 \end{aligned}, \text{ from which}$$

$$A_1 = -\frac{\sin(\kappa b)}{\sin(\kappa(a+b))}A_2 \text{ and } A_3 = -\frac{\sin(\kappa a)}{\sin(\kappa(a+b))}A_2 \text{ or} \quad [3a]$$

$$A_2 = \frac{\sin(\kappa(a+b))}{\sin(\kappa b)}A_1 \text{ and } A_3 = \frac{\sin(\kappa a)}{\sin(\kappa b)}A_1. \quad [3b]$$

This is the solution for three-source wave confinement as it defines the amplitudes and phases of two sources relative to the amplitude and phase of the third source (one arbitrary amplitude and phase). If there is attenuation ($\beta\neq 0$), the denominators in Equation 3b never vanish and a nonzero solution always exists which has one arbitrary amplitude and phase and no amplitudes vanish. In the absence of attenuation, one can show that solutions still exist, even though one of the three amplitudes may vanish, the system thereby reverting to the situation where N=2, or there may be two arbitrary amplitudes.

EXAMPLE 4

Conditions for Forming Standing Waves

If $a=\lambda/4$ and $b=\lambda/4$, the condition for forming a standing wave with an antinode symmetrically placed between the two nodes separated by $\lambda/2$ (See FIG. 1 hereof), is where the antinode driver (source 2) lags the node drivers (sources 1 and 3) by $\pi/2$; from Equation 3b, $$A_2 = 2e^{-i\frac{\pi}{2}}sh\left(\frac{\beta\lambda}{4}\right)A_1.$$

Figure 8B:
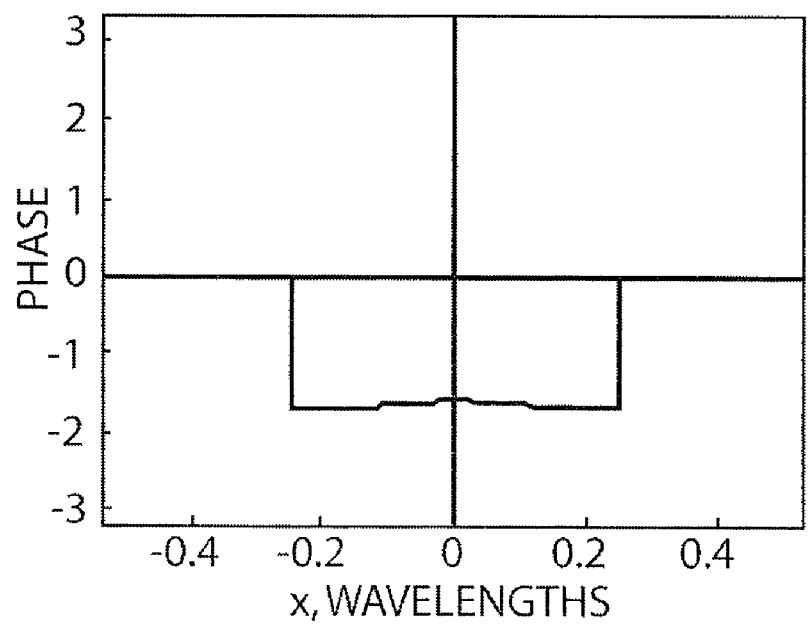
FIG. 8B is a graph of the phase of the elastic standing wave as a function of distance for the same location of the sources.
Figure 9A:
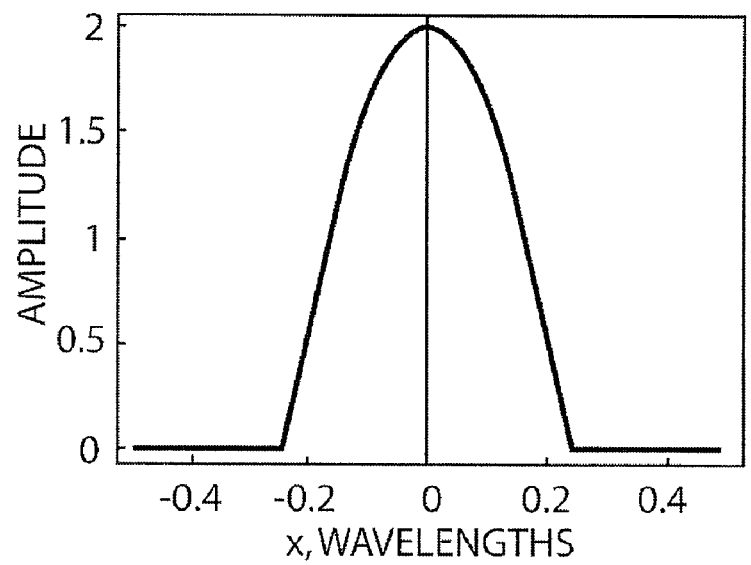
Figure 9B:
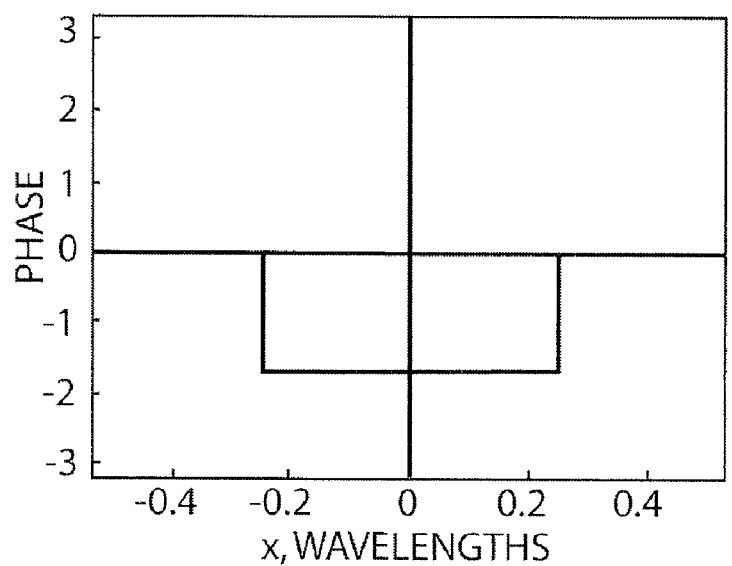
FIG. 9B is a graph of the phase of the elastic standing wave as a function of distance for the same configuration.

If the amplitude of antinode driver, $A_2$, is attenuated over a distance of $\lambda/4$, delayed an additional $\pi/2$, and added to the amplitude of the first node driver, $A_1$, attenuated over $\lambda/2$ and delayed by $\pi$, an exact cancellation of amplitude $A_3$ occurs at the other node driver. Similarly, an exact cancellation occurs at the first node driver. As $\beta\to 0$, the amplitude of the antinode driver or source also approaches zero since, with no attenuation, a non-zero driving amplitude at the antinode would generate a wave that would not cancel out and would thus leak out of the resonance cell. Under these conditions, the waves generated by the node drivers, in phase and of equal amplitude, cancel each other exactly at the nodes, while constructively adding at the antinode, there then being no requirement for an antinode driver. This is the situation where the denominators of Equation 3b vanish. With the node drivers located at exactly $\pm\lambda/4$, and the antinode driver disposed at the origin, it may be shown that even with a high attenuation coefficient (0.5 per wavelength), the phase varies little from $-\pi/2$ inside the active resonance cell (See FIG. 8B hereof.), while the resulting standing wave is confined between the node drivers and has an antinode that has a maximum amplitude at the antinode driver (See FIG. 8A hereof.). These results are almost indistinguishable from those for a fundamental-mode standing wave between two perfectly reflecting walls (See FIG. 9A and FIG. 9B hereof.).

Figure 10A:
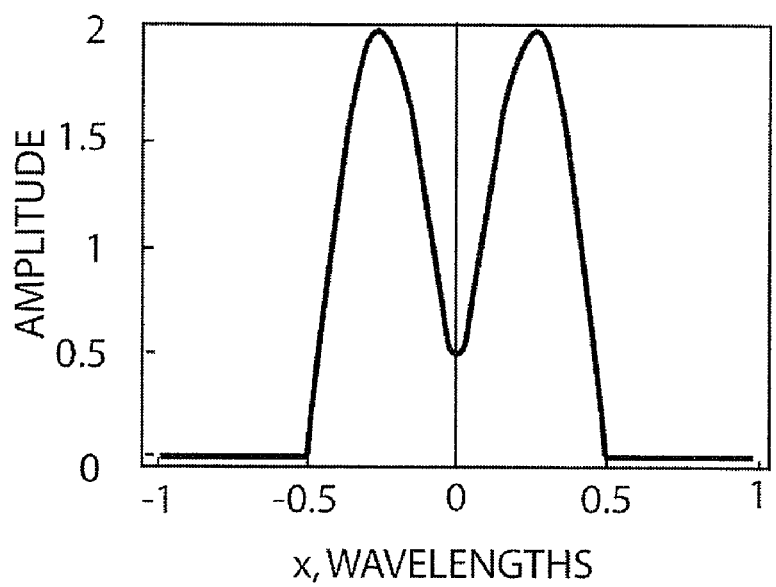
FIG. 10A is a graph of the amplitude of an elastic standing wave in an active resonance cell as a function of distance for a resonance cell twice as wide as that in FIG. 8A ($a=\lambda/2$ and $b=\lambda/2$) with an attenuation of 0.5 per wavelength, while FIG.
Figure 10B:
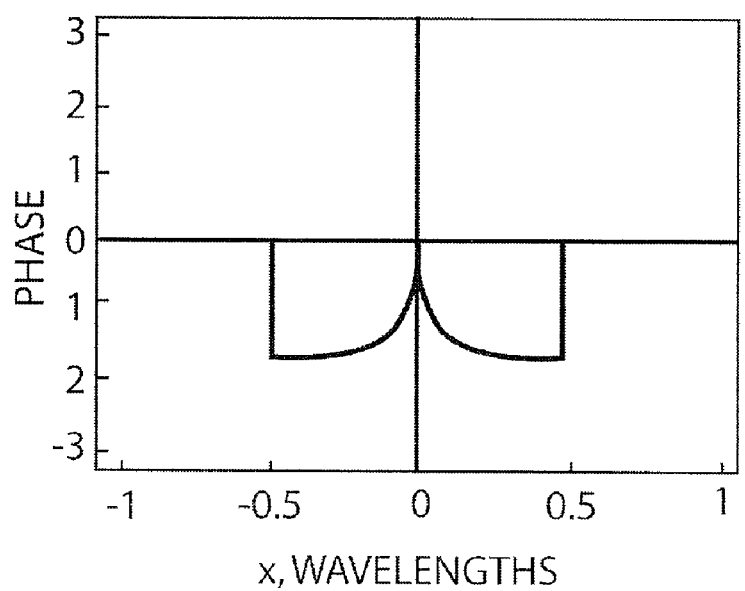

If the resonance cell is twice as wide as above, with $a=\lambda/2$ and $b=\lambda/2$, $$A_2 = 2ch\left(\frac{\beta\lambda}{2}\right)A_1;$$

all drivers are in phase, and the antinode driving amplitude is at least the sum of the node amplitudes (the equality occurring when there is no attenuation, and the amplitude is higher when attenuation is present). Given the phase delays and attenuations for this example, the waves cancel as is required at the nodes and outside of the interval, with the nodes at exactly $\pm\lambda/2$, even with a high attenuation of 0.5 per wavelength (See FIG. 10A and FIG. 10B.). It may be shown that the phase inside the acoustic resonance cell varies little around $-\pi/2$, except near the antinode driver (See FIG. 10B.). Further, the sign of the phase of the oscillations does not change throughout the cell, although the phase of a standing wave in a resonator of the same length would change sign at the origin and the total retardation would sum to zero.

Assuming now that the acoustic resonance cell is one-half as wide, that $a=\lambda/8$, and $b=\lambda/8$, as before the amplitudes and phases of the drivers can be obtained from Equation 3b. Also, as before, even with a high attenuation coefficient of 0.5 per wavelength, the oscillations are confined to the resonance cell (See FIG. 11A.) and the phase changes little between the nodes (See FIG. 11B.). Therefore, embodiments of the present invention generate operating active resonance cells where standing elastic waves are confined within the resonance cell and whose phase changes little between nodes spaced at other than one-half wavelength. That is, if this passive standing-wave condition is not met in the formation of an active resonance cell, a standing-wave suitable for the purposes of this invention can be established through suitable choices of phase and amplitude relationships between the node and antinode drivers.

EXAMPLE 5

Generic Source Placement

Evaluating Equation 3b for sources 1 and 2 separated by 0.45 half-wavelengths and sources 2 and 3 being separated by 0.75 half-wavelengths ($x_1=0.225\lambda$; $x_2=0$; $x_3=0.375\lambda$), for a total acoustic resonance cell length of 1.2 half-waves (20% greater length than a fundamental resonator), and an attenuation coefficient of 0.5 per wavelength, where the amplitude decreases by a factor of "e" over two wavelengths, the amplitude and phase curves shown in FIGS. 12A and 12B were obtained from the complex amplitudes for node drivers 1 and 3.

The above results indicate: (a) The amplitude outside of the active resonance cell is zero without constraining walls or reflective surfaces, in contrast to the situation where there are two sources, which only confine oscillations if they are separated exactly by $\lambda/2$ without attenuation; and (b) The phase of the oscillations inside the acoustic resonance cell does not change sign and varies little which means that the retardation along the axis of the acoustic resonance cell will add constructively.

This is an illustration of the phased array driving concept of the present invention since it shows that oscillation may be effectively confined by active means to a well-defined region of a long, continuous 1-dimensional medium, although the three drivers that define and drive the acoustic resonance cell are positioned: (i) asymmetrically; (ii) at distances that differ from those required for establishing conventional resonances; and (iii) the waves are strongly absorbed in the propagation medium.

Because of the linearity of the system, adjacent active resonance cells can share a node driver since the complex amplitude for this node is simply the sum of the required complex amplitudes required for each of the adjacent nodes. This illustrates the concept of a virtual stack of ARCs (FIGS. 2-4 hereof) driven by a phased array of PZTs in which node and antinode drivers alternate.

Since $\kappa$ is complex for nonzero attenuation, the denominators of Equations 4 do not vanish and, given a complex amplitude for the antinode source 2, there are always unique solutions for the complex amplitudes of node sources 1 and 3, such that the oscillations are confined to the interval between these two nodes. Therefore, if local noise/vibration cancellation circuits are used for the node drivers instead of using the computed values in Equations 3a,b (See, FIG. 3 hereof), there are always unique amplitudes and phases (the values in Equations 3a,b) for the noise cancellation controllers to converge to.

The confinement of the oscillations within the acoustic resonance cell is possible because the phases and amplitudes of the node driver oscillations may be adjusted to match the values given by Equations 3a and 3b. Noise/vibration cancellation is one embodiment of a phased array of drivers. Imperfect oscillation confinement/acoustic resonance isolation may also be useful. That is, for example, if 10%-20% of the wave amplitude were to leak through the nodes, the overall performance of the bar-shaped photoelastic modulator would likely function at between 80% and 90% of full efficiency and would still render excellent resolution possible for a Fourier transform spectrometer.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A high retardation-amplitude photoelastic modulator comprising in combination:
   a photoelastic element having a first end, an opposing second end, an optical axis passing through the first end and the second end, and a surface disposed between the first end and the second end;
   at least one active cell comprising:
      two spaced-apart first mechanical drivers affixed to the surface and having a first chosen distance therebetween along the optical axis; and
      a second mechanical driver affixed to the surface of said photoelastic element at a second chosen distance from one of said two first mechanical drivers along the optical axis and between said two first mechanical drivers;
   first means for driving one of said two first mechanical drivers;
   second means for driving a second of said two first mechanical drivers;
   third means for driving said second mechanical driver, wherein a standing elastic wave having a node along the optical axis at positions corresponding to each of said two first mechanical drivers, and an antinode along the optical axis between the nodes, and confined to said at least one active cell is generated, and wherein induced birefringence is produced along the optical axis in said at least one active cell between said two first mechanical drivers; and
   means for directing linearly polarized optical radiation along the optical axis, the optical radiation having an initial phase and a direction of polarization parallel to a principal axis, whereby the initial phase of the optical radiation is monotonically retarded as the optical radiation propagates along the optical axis within said at least one active cell.

2. The high retardation-amplitude photoelastic modulator of claim 1, wherein each of said at least one active cell shares one of said two first mechanical drivers from an adjacent active cell, and wherein the standing elastic wave does not change phase between adjacent active cells.

3. The high retardation-amplitude photoelastic modulator of claim 1, wherein said photoelastic element comprises an elongated bar having a long dimension and the optical axis is parallel to the long dimension.

4. The high retardation-amplitude photoelastic modulator of claim 1, wherein said two first drivers and said one second driver are disposed in a collinear geometry along the surface of said photoelastic element.

5. The high retardation-amplitude photoelastic modulator of claim 1, wherein said two first drivers, and said second driver comprise piezoelectric transducers.

6. The high retardation-amplitude photoelastic modulator of claim 5, wherein said piezoelectric transducers are affixed to the surface of said photoelastic element by an adhesive.

7. The high retardation-amplitude photoelastic modulator of claim 5, wherein said piezoelectric transducers comprise resonant piezoelectric transducers.

8. The high retardation-amplitude photoelastic modulator of claim 5, wherein said first means for driving one of said two first mechanical drivers, said second means for driving a second of said two first mechanical drivers, and third means for driving said second mechanical driver, each generate a periodic signal.

9. The high retardation-amplitude photoelastic modulator of claim 8, wherein each of said piezoelectric transducers transmits a mechanical force to said photoelastic element comprising a single-frequency sine waveform.

10. The high retardation-amplitude photoelastic modulator of claim 9, wherein said single-frequency sine waveform generates a wave in said photoelastic element having a wavelength, $\lambda$, the first chosen distance is $\lambda/2$, the second chosen distance is $\lambda/4$, wherein said two first mechanical drivers generate mechanical forces having the same phase, and wherein said second mechanical driver generates mechanical forces that have a phase lag of $\pi/2$ from the phase of either of said two first mechanical drivers.

11. The high retardation-amplitude photoelastic modulator of claim 1, further comprising a feedback loop, whereby a signal is generated by at least one of said first mechanical drivers to maintain a residual amplitude at each of the nodes such that the elastic wave generated in each of said active cells is confined to said active cell by active vibration cancellation.

12. A method for generating a high retardation-amplitude in optical radiation passing through a photoelastic modulator, comprising the steps of:
generating a standing elastic wave in a photoelastic element, having a surface, along an optical axis thereof using two first mechanical drivers attached to the surface and spaced apart at a first chosen distance along the optical axis, and a second mechanical driver disposed between the first mechanical drivers at a chosen distance along the optical axis from one of the first mechanical drivers, the two first mechanical drivers and the second mechanical driver forming an active cell, whereby an antinode in the elastic wave is formed on the optical axis between nodes formed on the optical axis at the positions corresponding to the two first mechanical drivers, birefringence is produced along the optical axis of the active cell between the two first mechanical drivers, and the elastic wave is confined to the cell; and
directing linearly polarized optical radiation along the optical axis, the optical radiation having an initial phase and a direction of polarization parallel to the first principal axis, whereby the initial phase of the optical radiation is monotonically retarded as the optical radiation propagates along the optical axis within the active cell.

13. The method of claim 12, wherein the photoelastic modulator has a plurality of active cells, each cell sharing one of the two first mechanical drivers from an adjacent active cell, and wherein the standing elastic wave does not change phase between adjacent active cells.

14. The method of claim 12, wherein the photoelastic element comprises an elongated bar having a long dimension and the optical axis is parallel to the long dimension.

15. The method of claim 12, wherein the two first drivers and one second driver are disposed in a collinear geometry along the surface of the photoelastic element.

16. The method of claim 12, wherein said two first drivers, and said second driver are piezoelectric transducers.

17. The method of claim 16, wherein the piezoelectric transducers are affixed to the surface of the photoelastic element by an adhesive.

18. The method of claim 16, wherein said piezoelectric transducers comprise resonant piezoelectric transducers.

19. The method of claim 16, wherein the piezoelectric transducers are driven using a periodic signal.

20. The method of claim 19, wherein each of the piezoelectric transducers transmits a mechanical force to the photoelastic element comprising a single-frequency sine waveform.

21. The method of claim 20, wherein said single-frequency sine waveform generates a wave in the photoelastic element having a wavelength, $\lambda$, the first chosen distance is $\lambda/2$, the second chosen distance is $\lambda/4$, wherein the two first mechanical drivers generate mechanical forces having the same phase, and wherein the second mechanical driver generates mechanical forces have a phase lag of $\pi/2$ from the phase of either of the two first mechanical drivers.

22. The method of claim 12, further comprising the step of generating a signal by at least one of the first mechanical drivers as part of a feedback loop to maintain a residual amplitude at each of the nodes such that the elastic wave generated in each of the active cells is confined to the active cell by active vibration cancellation.

23. An interferometer comprising in combination:
a photoelastic element having a first end, an opposing second end, an optical axis passing through the first end and the second end, and a surface disposed between the first end and the second end;
at least one active cell comprising:
two spaced-apart first mechanical drivers affixed to the surface and having a first chosen distance therebetween along the optical axis; and
a second mechanical driver affixed to the surface of said photoelastic element at a second chosen distance from one of said two first mechanical drivers along the optical axis and between said two first mechanical drivers;
first means for driving one of said two first mechanical drivers;
second means for driving a second of said two first mechanical drivers;
third means for driving said second mechanical driver, wherein a standing elastic wave having a node along the optical axis at positions corresponding to each of said two first mechanical drivers, and an antinode along the optical axis between the nodes and confined to said at least one active cell, is generated, and wherein induced birefringence is produced along the optical axis in said at least one active cell between said two first mechanical drivers;
a first polarizer having a first axis of polarization at 45° relative to the direction of a principal axis of said photoelastic element;
a second polarizer having a second axis of polarization at 45° relative to the direction of the principal axis; and means for directing optical radiation along the optical axis, such that the optical radiation passes through said first polarizer and emerges linearly polarized along the first axis of polarization before entering said photoelastic element in which two linearly polarized components of the optical radiation are generated, a first component parallel to the principal axis of the induced birefringence having a first phase and a second component perpendicular to the first component and having a second phase, the first phase being monotonically retarded relative to the second phase as the optical radiation propagates through said at least one active cell, and such that the first component and the second component pass through said second polarizer and emerge therefrom as third linearly polarized optical radiation and fourth linearly polarized optical radiation both having a direction of polarization parallel to the second polarization axis, the third optical radiation and the fourth optical radiation having the relative phase retardation as that after exiting the photoelastic element.

24. The interferometer of claim 23, wherein each of said at least one active cell shares one of said two first mechanical drivers from an adjacent active cell, and wherein the standing elastic wave does not change phase between adjacent active cells.

25. The interferometer of claim 23, wherein said photoelastic element comprises an elongated bar having a long dimension and the optical axis is parallel to the long dimension.

26. The interferometer of claim 23, wherein said two first drivers and said second driver are disposed in a collinear geometry along the surface of said photoelastic element.

27. The interferometer of claim 23, wherein said two first drivers, and said second driver comprise piezoelectric transducers.

28. The interferometer of claim 27, wherein said piezoelectric transducers are affixed to the surface of said photoelastic element by an adhesive.

29. The interferometer of claim 27, wherein said piezoelectric transducers comprise resonant piezoelectric transducers.

30. The interferometer of claim 27, wherein said first means for driving one of said two first mechanical drivers, said second means for driving a second of said two first mechanical drivers, and third means for driving said second mechanical driver, each generate a periodic signal.

31. The interferometer of claim 30, wherein each of said piezoelectric transducers transmits a mechanical force to said photoelastic element comprising a single-frequency sine waveform.

32. The interferometer of claim 31, wherein said single-frequency sine waveform generates a wave in said photoelastic element having a wavelength, $\lambda$, the first chosen distance is $\lambda/2$, the second chosen distance is $\lambda/4$, wherein said two first mechanical drivers generate mechanical forces having the same phase, and wherein said second mechanical driver generates mechanical forces that have a phase lag of $\pi/2$ from the phase of either of said two first mechanical drivers.

33. The interferometer of claim 23 further comprising a feedback loop, whereby a signal is generated by at least one of said first mechanical drivers to maintain a residual amplitude at each of the nodes such that the elastic wave generated in each of said active cells is confined to said active cell by active vibration cancellation.

* * * * *